US008042765B1

(12) United States Patent
Nance

(10) Patent No.: US 8,042,765 B1
(45) Date of Patent: Oct. 25, 2011

(54) AIRCRAFT LANDING GEAR COMPRESSION RATE MONITOR

(76) Inventor: C. Kirk Nance, Keller, TX (US)

( * ) Notice: Subject to any disclaimer, the term of this patent is extended or adjusted under 35 U.S.C. 154(b) by 748 days.

(21) Appl. No.: 12/123,891

(22) Filed: May 20, 2008

(51) Int. Cl.
*B64C 25/00* (2006.01)

(52) U.S. Cl. .................................. 244/100 R; 73/178 H

(58) Field of Classification Search ............... 244/100 E, 244/104 R, 104 FP; 348/144; 340/946; 73/178 H; 701/5; 356/28; 382/170
See application file for complete search history.

(56) References Cited

U.S. PATENT DOCUMENTS

| | | | |
|---|---|---|---|
| 2,587,628 A | 3/1952 | King | |
| 3,273,382 A | 9/1966 | Fonash | |
| 3,401,388 A | 9/1968 | Phillips | |
| 3,517,550 A | 6/1970 | Leventhal | |
| 3,581,836 A | 6/1971 | Segerdahl et al. | |
| 3,712,122 A | 1/1973 | Harris et al. | |
| 3,944,729 A * | 3/1976 | Tsoubanos | 348/144 |
| 3,946,358 A | 3/1976 | Bateman | |
| 4,278,219 A | 7/1981 | Finance | |
| 4,302,827 A | 11/1981 | Rosenblum | |
| 4,528,564 A | 7/1985 | Trampnau | |
| 4,551,723 A * | 11/1985 | Paterson | 340/946 |
| 4,671,650 A * | 6/1987 | Hirzel et al. | 356/28 |
| 4,685,143 A * | 8/1987 | Choate | 382/170 |
| 4,770,372 A | 9/1988 | Ralph | |
| 4,869,444 A | 9/1989 | Ralph | |
| 4,979,154 A | 12/1990 | Brodeur | |
| 5,214,586 A | 5/1993 | Nance | |
| 5,260,702 A | 11/1993 | Thompson | |
| 5,406,487 A | 4/1995 | Tanis | |
| 5,511,430 A | 4/1996 | Delest et al. | |
| 5,548,517 A | 8/1996 | Nance | |
| 6,012,001 A | 1/2000 | Scully | |
| 6,032,090 A | 2/2000 | von Bose | |
| 6,120,009 A * | 9/2000 | Gatehouse et al. | 267/64.11 |
| 6,128,951 A | 10/2000 | Nance | |
| 6,237,406 B1 | 5/2001 | Nance | |
| 6,237,407 B1 | 5/2001 | Nance | |
| 6,293,141 B1 | 9/2001 | Nance | |
| 6,588,282 B2 | 7/2003 | Arms | |
| 6,676,075 B2 | 1/2004 | Cowan et al. | |
| 7,193,530 B2 | 3/2007 | Nance | |
| 7,274,309 B2 | 9/2007 | Nance | |
| 7,274,310 B1 | 9/2007 | Nance | |
| 2005/0033489 A1 | 2/2005 | Tezuka | |
| 2006/0144997 A1 | 7/2006 | Schmidt et al. | |

\* cited by examiner

*Primary Examiner* — Galen Barefoot
(74) *Attorney, Agent, or Firm* — Geoffrey A. Mantooth

(57) ABSTRACT

A system for use in monitoring, measuring, computing and displaying the rate of compression of aircraft landing gear struts experienced while aircraft are executing either normal or hard landing events. A high speed computer attached to high speed cameras, or range-finders, mounted in relation to each of the landing gear struts are used to monitor, measure and record the landing gear compression rates and aircraft touch-down vertical velocities experienced by landing gear struts, as the aircraft landing gear initially comes into contact with the ground. The system also determines through landing gear strut compression rates if aircraft landing limitations have been exceeded.

27 Claims, 13 Drawing Sheets

(view from aft, looking forward)

targeted distance measurement with un-obstruct field of view

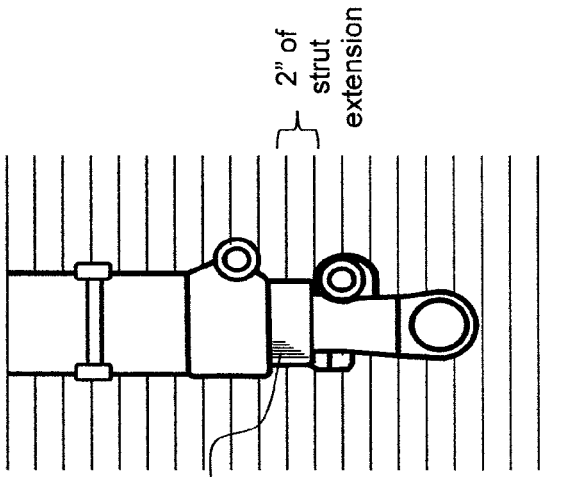
FIG. 8A
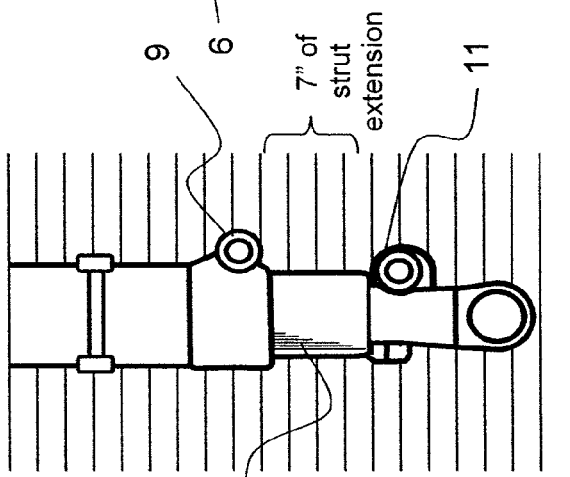
FIG. 8B
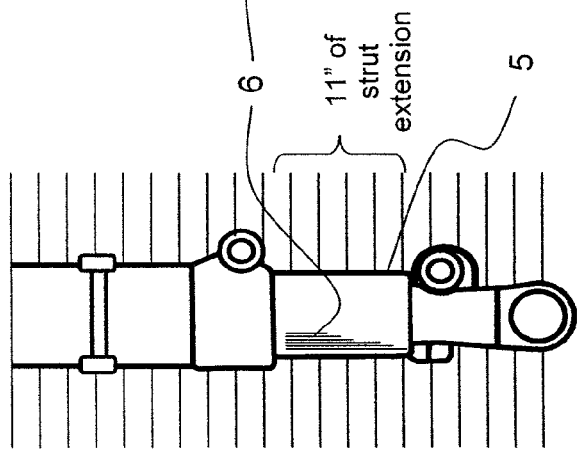
FIG. 8C
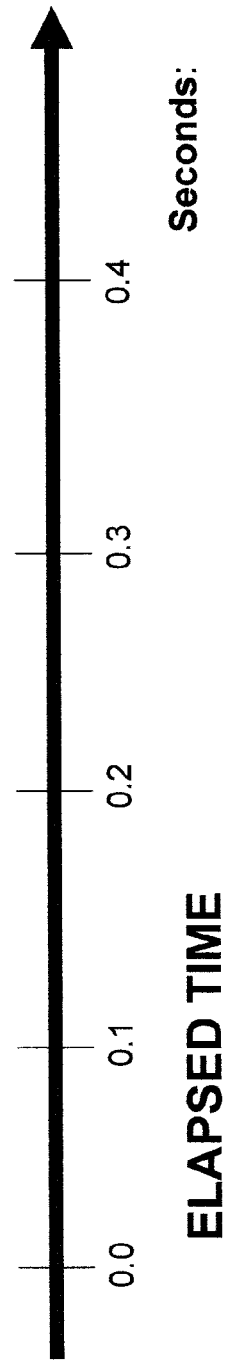

AIRCRAFT LANDING GEAR COMPRESSION RATE MONITOR

BACKGROUND OF THE INVENTION

An aircraft is typically supported by plural pressurized landing gear struts. Each landing gear strut is designed much like, and incorporates many of the features of, a typical shock absorber. Designs of landing gear incorporate moving components which absorb the impact force of landing. Moving components of an aircraft landing gear shock absorber are commonly telescopic elements. An alternate type of landing gear incorporates a trailing arm design which forms a triangle shape, where the main supporting body of the landing gear is hinged with a trailing arm, and a typical shock absorber functions as the third side of the triangle. The shock absorber of both types of landing gear comprise internal fluids, both hydraulic fluid and compressed nitrogen gas, and function to absorb the vertical descent forces generated when the aircraft lands.

Aircraft have limitations regarding the maximum allowable force the aircraft landing gear and other supporting structures of the aircraft can safely absorb when the aircraft lands. Landing force limitations, which are often related to aircraft vertical velocity (sink-rate) at initial contact with the ground, are a key factor in determining the maximum landing weight for aircraft.

Aircraft routinely depart from an airport with the aircraft weight less than the maximum take-off weight limitation, but greater than the maximum landing weight limitation. During the flight, in-route fuel is burned to reduce the aircraft weight, below the maximum landing weight limitation. Situations often arise where an aircraft has left the departure airport, and the pilot discovers the need to immediately return and land, without the time or opportunity, to burn-off the planned in-route fuel. This causes an overweight landing event. When an overweight landing occurs, the FAA (Federal Aviation Administration) and aircraft manufacturer require the aircraft be removed from service and a manual inspection performed to check for damage of the landing gear and the connection fittings of the landing gear to the aircraft.

Title 14—Part 25, Chapter §25.473 of the current FAA regulations define the assumed maximum vertical velocity at which an aircraft would come into contact with the ground as being ten feet per second (10 fps). The origination of this rule comes from the Civil Aeronautics Board—Civil Air Regulations, Part 4, Chapter §4.24, dated: Nov. 9, 1945. Today an aircraft's maximum landing weight (MLW) limitation is determined by the manufacturer, who must design and demonstrate the structural integrity of the aircraft and landing gear, to allow for the weight of that aircraft to land at maximum landing weight, with a vertical velocity of 10 fps. FAA Regulations assume the aircraft is landing with each of the main landing gear simultaneously touching the ground and the landing force being equally distributed between the two main landing gears. However, cross-wind landings are a common occurrence. In cross-wind situations, the pilot will adjust the lateral angle of the aircraft to lower the wing pointed in the direction of the cross-wind. Lowering this windward wing aides in stabilizing the aircraft against a sudden gust of stronger cross-wind; but also increases the possibility that the aircraft will have an asymmetrical landing gear touch-down. Currently there are no devices certified by the FAA and installed on aircraft to measure and monitor individual landing gear compression rates nor the aircraft descent velocity at initial contact with the ground.

As the aircraft descends towards the runway, the landing gear is extended. Each of the landing gear maintains an internal pre-charge pressure within the shock strut. The pre-charge pressure is a relatively low pressure, which is maintained to insure the landing gear shock absorber component is extended to full strut extension, prior to landing. At full extension, the shock absorber can absorb its maximum amount of landing force. As the landing gear comes into initial contact with the ground, the strut begins to compress, thereby increasing the pressure within the shock absorber. Increases in pressure, beyond the pre-charge pressure, creates additional resistance to the compression rate of the landing gear strut, which helps reduce the vertical velocity of the aircraft.

The FAA requires flight data recorders (FDR) on transport category aircraft. The FDR incorporates multi-axis accelerometers (located at the center of gravity of the aircraft hull) which measure various shock loads that become evident during an abrupt landing event. The accelerometer data is usually not available unless an accident has occurred, and the FDR is removed from the aircraft, the data downloaded, and then analyzed. Assuming one might attempt to determine landing gear compression rate from the FDR data, the information would be merely calculations from measurements taken not at the respective landing gear locations of the aircraft, but along the center-line of the aircraft. The FDR calculations would not be associated with the compression rate of any respective landing gear strut, but rather any changes in acceleration for the aircraft hull as a whole.

Research of prior art identifies numerous systems which measure whole aircraft descent velocity. Though it is advantageous for pilots to know the average descent velocity or sink-rate of the aircraft while approaching a runway for landing, the actual descent velocity can vary drastically due to non-pilot actions including such factors as varying wind conditions. The descent velocity of the whole aircraft hull the does not necessarily indicate the compression rate of any respective landing gear strut as it comes into initial contact with the ground.

Prior art to determine aircraft descent velocity is well documented. Reference is made to U.S. Pat. No. 3,712,1228—Harris; U.S. Pat. No. 6,012,001—Scully, and U.S. Pat. No. 4,979,154—Brodeur. These and other patents describing similar but subtly different techniques teaching the use of various range-finder devices, attached to the aircraft hull, which measure the distance between the aircraft hull and the ground, as well as the rate of change of those measurements. The prior art does not measure the compression rate of each respective landing gear, as they come into contact with the ground; nor do they take the approach of using more advanced, short-range, high accuracy, targeted sonic or laser measuring devices, to measure the actual compression rate of the landing gear strut, by measuring closure rates between the relatively short distance from a targeted point of the lower moving portion of the landing gear strut as compared to the fixed portion of the upper strut, or the under surface of the aircraft hull. Reducing the range of the measurement increases the accuracy of the measurement.

As an aircraft approaches a runway for landing, if the pilot properly flares the aircraft, the sink-rate of the aircraft will dramatically reduce, just above the runway surface. During the aircraft flare procedure, a cushion of air is developed by the downward force of air generated by the wing coming near the ground surface. This cushion of air is often referred to as "ground effect" and will substantially reduce the descent velocity of the aircraft. In ground effect, the aircraft is reaching a stall situation which reduces the lifting force generated by the wings. Aircraft wing oscillation can occur, where the aircraft wings flutter from side to side. This is another situation where an asymmetrical landing gear touch-down will occur. Aircraft sink-rate, measured with accelerometers along the centerline of the aircraft, will not detect wing oscillation and will not determine the initial compression rate experienced by each individual land gear, when the aircraft comes into initial contact with the ground.

Additional search of prior art relating to landing gear identified U.S. Pat. No. 2,587,628—King, which teaches an apparatus for testing "yieldable load carrying structures" such as aircraft landing gear. King teaches monitoring the rate of deceleration of the mass supported by the landing gear and the effects on other connected landing gear elements. King teaches the relationship between the telescopic compression of the landing gear, as compared to shear deflection to other structural members of that same landing gear. King teaches apparatus used as a tool to determine the effective change in the fatigue life limitations of a particular landing gear structural component, by tracking the rate of change in force applied to the shock absorbing components attached to said fatigue life limited structural component. King does not teach landing gear strut rate of compression, as related to aircraft sink rate at initial contact with the ground.

U.S. Pat. No. 3,517,550—Leventhal, teaches the relationship of comparing internal strut pressure increases, as related to the rate of landing gear strut compression, thereby determining the rate of change in descent velocity. Though the approach may appear valid, it is subject to error by its inability to verify, at any given landing event, the exact proportion of gas volume in relation to hydraulic oil volume, within the landing gear strut.

U.S. Pat. No. 6,128,951—Nance, teaches the measuring of strut pressure within each landing gear strut, as well as determining the current proportion or ratio of gas to hydraulic oil within each respective landing gear strut. Internal strut pressure, compared to strut extension, is not a linear relationship. Commonly aircraft maintenance technicians observed landing gear struts which appear near deflated, due to hydraulic oil having escaped through the strut seals. Mistakenly assuming the landing gear has lost nitrogen gas, the technician adds additional gas to the strut, thus the landing gear strut is now over-charged with gas. The now changed and unknown volume of gas being compressible and that variance in volume of gas as compared to the unknown volume of non-compressible hydraulic oil having changed, would thereby vary the compression rate of the landing gear strut and generate errors in the velocity calculation. Also, pressure within a landing gear strut is contained by the friction of the landing gear strut seals.

U.S. Pat. No. 5,214,586—Nance teaches distortions in landing gear strut pressure measurements caused by landing gear strut seal friction. Landing gear strut seal friction can distort internal strut pressure measurements by as much as 5% of the applied weight. Attempts to determine initial aircraft touch-down velocity at the landing gear strut would be subject to errors caused by the friction of the strut seals distorting pressure measurements and delaying any increases in internal landing gear strut pressure. These delays in any increase in strut pressure due to strut seal friction would distort the accuracy of a direct comparison of rate of internal pressure increases to strut compression.

U.S. Pat. Nos. 7,193,530; 7,274,309; 7,274,310—Nance teach the measurement of the rate of compression of landing gear strut by a different means than that of the new invention described in this application. The prior art of Nance teaches the use of mechanical rotation sensors to measure rotation rates of rotating elements (scissor links) of the telescopic landing gear, then using geometry to determine the rate of landing gear strut compression; combined with the pressure sensors monitoring internal strut pressure increases, as a cross-check function to increase confidence in the accuracy of the mechanical measurement.

SUMMARY OF THE INVENTION

It is one object of the present invention to measure respective aircraft landing gear rate of compression.

It is another object of present invention to provide a tool to automatically determine if an initial landing gear strut compression rate, which relates to the aircraft sink-rate has exceeded an aircraft limitation, thereby determining a required inspection for overweight landings and hard landing events.

The present invention provides a method of monitoring landing gear on an aircraft at initial contact of the landing gear with the ground, each landing gear comprising a strut, which is capable of extension. The extension of one of the struts is measured before contact of the respective landing gear with the ground. The extension of the one strut is measured during initial contact of the respective landing gear with the ground. The amount of changed extension of the one start is measured in relation to elapsed time. The rate of compression of the one strut is determined from the measured amount of changed extension of the one strut in relation to elapsed time. An indication of the rate of compression of the one strut is provided.

In accordance with one aspect of the present invention, the step of measuring the amount of changed extension of the one strut further comprises the step of measuring the strut extension from a location that is off of the one strut.

In accordance with another aspect of the present invention, step of measuring the strut extension from a location that is off of the one strut further comprises the step of photographing moving and non-moving parts of the landing gear strut.

In accordance with another aspect of the present invention, wherein the step of photographing moving and non-moving parts of the landing gear strut further comprises the step of comparing changes in strut extension relative to earlier recorded strut extension of the same landing gear.

In accordance with another aspect of the present invention, the step of photographing moving and non-moving parts of the landing gear strut further comprises the step of photographing the landing gear with a high speed camera.

In accordance with another aspect of the present invention, the step of measuring the strut extension from a location that is off of the one strut further comprises the step of photographing an exposed portion of a telescoping element of a telescoping landing gear strut.

In accordance with another aspect of the present invention, the step of measuring the strut extension from a location that is off of the one strut further comprises the step of photographing a rotating element of a trailing arm landing gear strut.

In accordance with another aspect of the present invention, steps of measuring the extension of one of the struts before contact of the respective gear with the ground, measuring the extension of the one strut during initial contact of the respective landing gear with the ground and measuring the amount of changed extension of the one strut in relation to elapsed time further comprises the step of determining the distance of a selected portion on the landing gear from the aircraft hull.

In accordance with another aspect of the present invention, the step of determining the distance of a selected portion on the landing gear from the aircraft hull further comprising the step of using a range-finder.

In accordance with another aspect of the present invention, further steps are determining if the rate of compression exceeds a predetermined threshold and providing an indication if the rate of compression exceeds the predetermined threshold.

In accordance with another aspect of the present invention, the step of measuring the extension of one of the struts further comprises the steps of measuring the extension of all of the struts; the step of determining the rate of compression of the one strut further comprises the step of determining the rate of compression of all of the struts; the step of determining if the rate of compression exceeds a predetermined threshold further comprises the step of determining if each rate of compression exceeds the respective predetermined threshold; identifying which, if any, strut experienced a rate of compression that exceeds the respective threshold; providing an indication of the identified strut for inspection purposes.

In accordance with another aspect of the present invention, further steps are measuring an inclination, angle and pitch of the aircraft hull in relation to an aircraft landing gear strut, and correcting such landing gear strut angle to that of a vertical position so as to determine the rate of compression as to vertical.

The present invention also provides a method of monitoring landing gear on an aircraft at contact of the landing gear with the ground, each landing gear comprising a strut, which is capable of extension, comprising the steps of measuring the extension of one of the struts before contact of the respective landing gear with the ground; measuring the extension of the one strut during initial contact of the respective landing gear with the ground; measuring the amount of changed extension of the one strut in relation to elapsed time by measuring the distance of a selected portion of the one strut from the hull; determining the rate of compression of the one strut from the measured amount of changed extension of the one strut in relation to elapsed time; providing an indication of the rate of compression of the one strut.

In accordance with an aspect of the present invention, the step of measuring the distance of a selected portion of the one strut from the hull further comprises the step of determining the distance of a tire on the one strut to the hull.

In accordance with another aspect of the present invention, the step of measuring the distance of a selected portion of the one strut from the hull further comprises the step of determining the distance of a reflector on the one strut to the hull.

In accordance with another aspect of the present invention, the step of measuring the distance of a selected portion of the one strut from the hull further comprises the step of using a range-finder.

The present invention also provides a method of confirming that the aircraft has actually come into contact with the ground, the aircraft comprising landing gear struts, which struts are capable of compression and extension, comprising the steps of determining when the landing gear struts are deployed to an extended position, the deployed struts having an extended configuration; from a location that is off of the landing gear, determining when the landing gear is compressed.

In accordance with another aspect of the present invention, the step of determining when the landing gear is compressed comprises the step of photographing moving and non-moving parts of the landing gear strut.

In accordance with another aspect of the present invention, the step of determining when the landing gear is compressed comprises the step of determining the distance of a selected portion on the landing gear from the aircraft hull.

The present invention also provides an apparatus for monitoring landing gear of an aircraft during initial landing gear contact with the ground, each landing gear comprising a strut, comprising: a camera coupled to the under portion of the aircraft and having a field of view that encompasses one of the struts as so as to monitor the extension of one of the struts; a computer having an input that is connected to said camera, said computer records the extension of the one landing gear strut in relation to elapsed time, said computer determines the rate of compression of the one landing gear strut and determines the descent velocity of the aircraft and provides a descent velocity output; an indicator connected to the computer descent velocity output.

In accordance with another aspect of the present invention, further comprising a light source located on the aircraft so as to illuminate the one strut.

In accordance with another aspect of the present invention, further comprising: a hull inclinometer coupled to the aircraft the computer has an input that is connected to the hull inclinometer, the computer compensating the measurements of landing gear rate of compression with the measurements from the hull inclinometer to determine a true vertical descent velocity.

In accordance with another aspect of the present invention, wherein the computer determines if the rate of compression exceeds a predetermined threshold and if so provides an output to the indicator.

The present invention provides an apparatus for monitoring landing gear of an aircraft during initial landing gear contact with the ground, each landing gear comprising a strut, comprising: a range-finder coupled to the under portion of the aircraft and located so as to monitor the extension of one of the struts; a computer having an input that is connected to said range-finder, said computer records the extension of the one landing gear strut in relation to elapsed time, said computer determines the rate of compression of the one landing gear strut and determines the descent velocity of the aircraft and provides a descent velocity output; an indicator connected to the computer descent velocity output.

In accordance with another aspect of the present invention, wherein the range-finder is directed so as to monitor a tire of the one strut.

In accordance with another aspect of the present invention, wherein the range-finder is directed so as to monitor a reflector.

In accordance with another aspect of the present invention, a hull inclinometer coupled to the aircraft; the computer has an input that is connected to the hull inclinometer, the computer compensating the measurements of landing gear rate of compression with the measurements from the hull inclinometer to determine a true vertical descent velocity.

In accordance with another aspect of the present invention, wherein the computer determines if the rate of compression exceeds a predetermined threshold and if so provides an output to the indicator.

BRIEF DESCRIPTION OF THE DRAWINGS

Although the features of this invention, which are considered to be novel, are expressed in the appended claims, further details as to preferred practices and as to the further objects and features thereof may be most readily comprehended through reference to the following description when taken in connection with the accompanying drawings, wherein:

FIGS. 8A, 8B, and 8C are an illustration of software program Alpha—Digital Photograph Mapping and Comparison of Landing Gear Strut Compression, which determines a measured amount of the landing gear telescopic compression, as related to elapsed time; which identifies, maps and compares extension amounts of landing gear telescopic components, utilizing photographic image recognition features.

DETAILED DESCRIPTION OF THE PREFERRED EMBODIMENT

Figure 1:
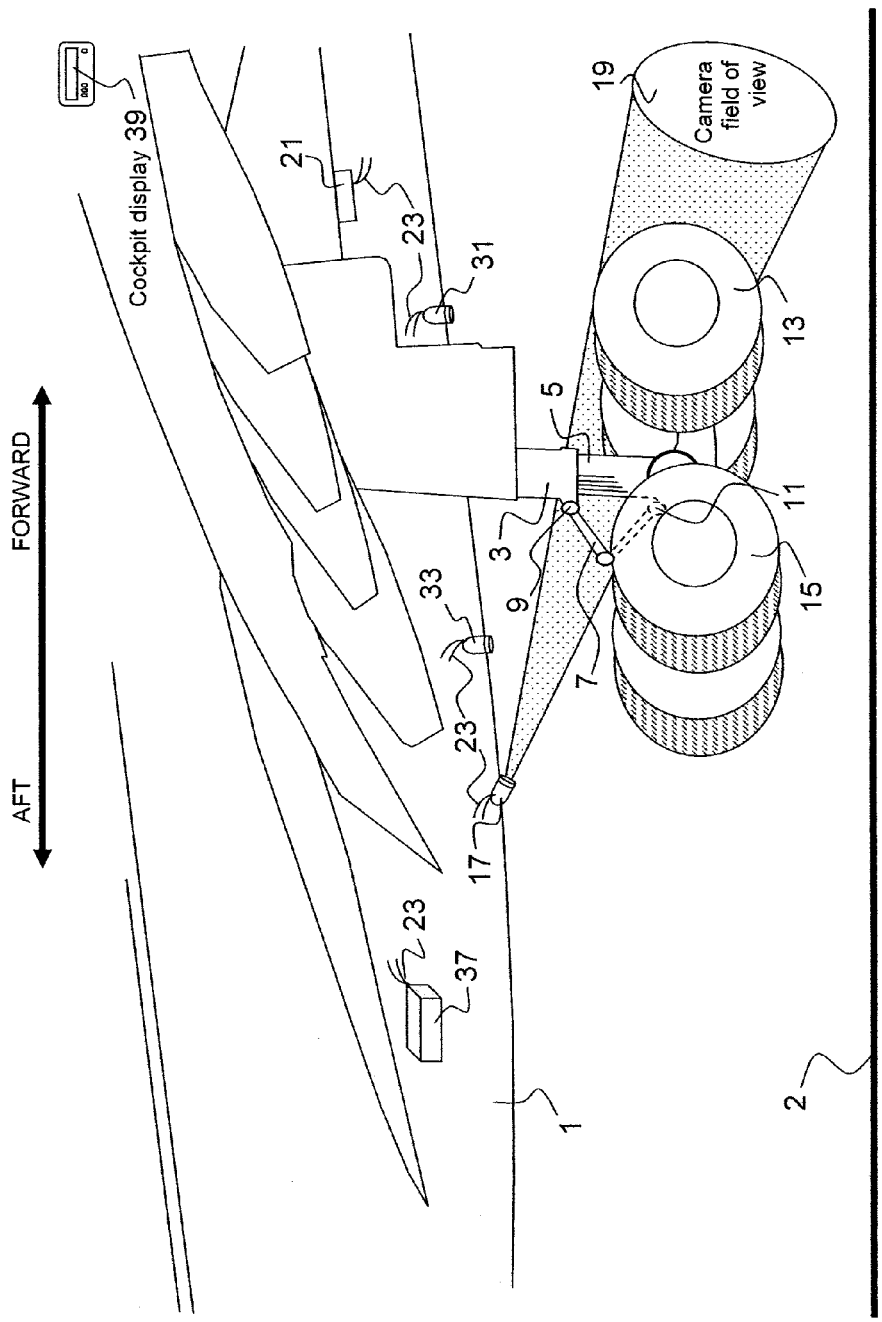
FIG. 1 is a side view of a typical commercial airliner with landing gear extended, illustrating the lower portion of the aircraft hull, with attached high speed camera unit, identifying the camera's field of view.

The present invention measures and determines the compression rate experienced by each landing gear strut on initial contact with the ground. The strut is monitored for compression so as to confirm that the aircraft has touched ground and also to determine the rate of strut compression and the descent velocity.

The present invention detects initial and continued movement of the landing gear strut by rapidly creating multiple digital photographs of the strut, prior to initial contact with the ground, as well as throughout the remainder of the landing event. The photographs are taken at a very rapid rate and are stored within a computer which is part of the system. The computer then compares the sequential photographs, maps the changes in strut configuration and compares the amount of strut changes in relation to elapsed time. Strut movement includes strut extension and compression.

The present invention works with telescoping strut designs and trailing arm strut designs. Telescoping struts have a telescoping element. This telescoping element is shiny metal, such as polished chrome, and is easy to identify in photographs. The continual telescopic action of the landing gear strut keeps this chrome finish clean and easy to identify. Also, struts have easy to identify points of structure on both the moving lower strut portion and also on the fixed upper strut portion. Review and mapping of sequential photographs looks for compression or shortening of this telescoping element and identifies the amount of compression over time. The present invention described herein uses a high speed camera, a computer and image recognition software to monitor, map, measure and determine the compression of the strut, as well as the rate of closure between specific points of the lower portion of the landing gear strut, as compared to fixed upper stationary portions of the same landing gear stmt. That rate of closure is the rate of strut compression, also being the vertical velocity of the aircraft as it comes into initial contact with the ground. This allows the monitoring of aircraft landing gear rate of compression without increasing the risk of possible landing gear failure due to increased complexity to the landing gear system, which could be caused by the installation onto the landing gear of additional new components, needed for the mechanical measurements of strut movement. This new invention measures the rate of strut compression without adding complexity to the landing gear equipment by using remotely located, or off strut, high-speed digital cameras or targeted range-finder devices to monitor the landing gear and identify the range of movement of a specific point on the lower portion of the telescopic landing gear strut, as compared to a specific point of the upper fixed body, of that same landing gear strut or aircraft hull, as further measured against elapsed time. This chrome finish area is visible and easily identified in photographs. Photographs, or images, are rapidly taken as time advances, which illustrate different amounts of chrome finish exposed, thus allowing for the comparison of sequential photographs, or images, and determination of the amount of change in landing gear strut compression, in relation to elapsed time. High speed digital camera equipment can be attached to the aircraft lower hull. The speed and ability to identify these initial and very minor changes in the amount of strut compression allows for the initial strut compression rate to be measured, mapped and determined.

A trailing arm landing gear design has a somewhat different design. The trailing arm design forms a triangle with three sides consisting of: a primary strut body, a trailing arm and a shock absorber. As the trailing arm type of landing gear compresses, the side consisting of the shock absorber will become shorter, changing the geometry of the triangle. Review and mapping of sequential photographs allows simple geometry equations to be used to relate the changes in the triangular shapes resulting from the compression of a trailing arm landing gear design to determine the vertical compression of the landing gear. That changing geometry measured against elapsed time will determine the compression rate of the trailing arm landing gear design. The detection and rate of landing gear strut movement are determined during the initial contact period of the landing gear with the ground. Upon detection of the initial movement of a respective landing gear strut, the step of monitoring the rate and amount of additional strut compression is used to determine the initial touch-down, vertical velocity of each respective strut, during initial contact with the ground.

This new invention additionally offers the feature of measuring the compression rate of the landing; gear strut by using targeted sonic and/or laser range-finder devices to monitor the closer rate between a fixed point of the aircraft hull and a moving point (such as a tire) located on the telescopic and/or rotating trailing arm portion of the landing gear strut.

Referring now to the drawings, wherein like reference numerals designate corresponding parts throughout the several views and more particularly to FIG. 1 thereof, there is shown the lower portion of a typical commercial aircraft hull 1 with a landing gear shock strut consisting of an oleo-type shock strut body 3 and a chrome plated steel telescoping piston 5. Steel piston 5 is restricted from rotation within strut body 3 by a scissor mechanism called a torque-link 7. Torque link 7 is connected to strut body 3 at upper torque-link rotation collar 9. Torque link 7 is connected to steel piston 5 at lower torque-link rotation collar 11. The entire aircraft comes into contact with the ground 2 by resting on multiple sets of tires and illustrated by a forward tire 13 and an aft tire 15. A high-speed digital camera 17 is attached to the under-side of aircraft hull 1 (or wing) in a manner which allows the camera 17 to have an "unobstructed field of view" 19 of the entire range of movement of telescoping piston 5. As used herein, hull includes the aircraft fuselage and wings. The camera 17 is located off of the strut, so as to be able to take a picture of the strut. Camera 17 rapidly captures numerous sequential digital photographs of the movement of each respective telescoping piston 5. The camera 17 has adequate resolution to be used in measuring the extension of the strut. Aircraft angle data compared to that of an aircraft level posture is measured by inclinometer 21. Digital photographs and aircraft hull angle data are transmitted to an onboard computer 37, via wiring harness 23. Comparison of the multiple photographs, with the further mapping and measuring of the movement of piston 5 is a method of determining and measuring telescopic strut extension and compression, in relation to elapsed time. Landing gear compression rate data, as well as aircraft vertical velocity data is available to the pilots in the cockpit on indicator 39.

Figure 2A:
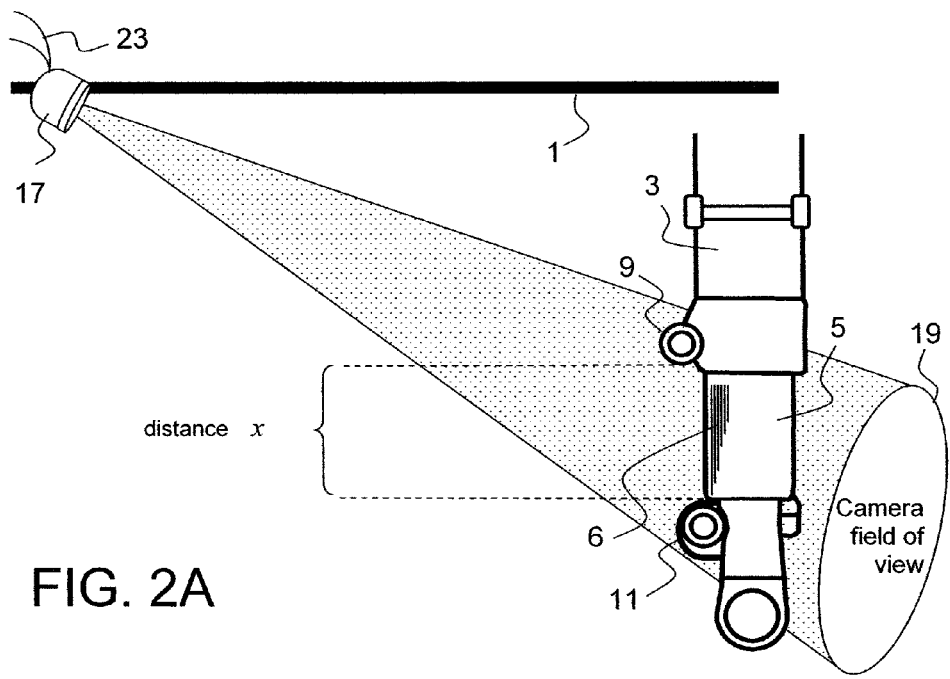
FIGS. 2A and 2B are a side view of two typical telescopic design commercial airliner landing gear struts in both an extended and compressed configuration, with attached high speed camera unit, identifying the camera's field of view.
Figure 2B:
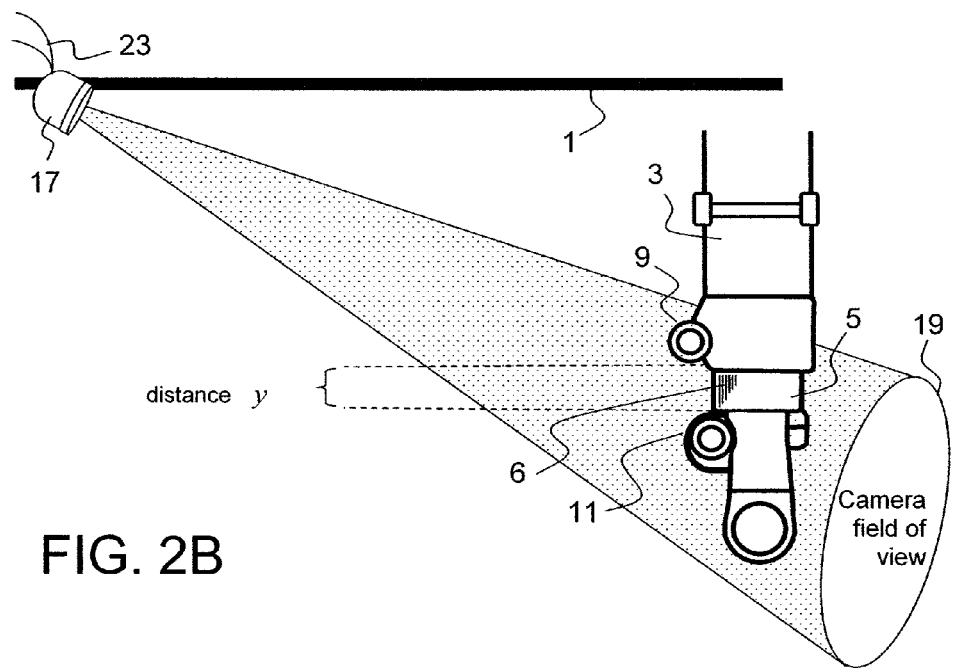

Referring now to FIGS. 2A and 2B there is shown a close up view of strut body 3 containing telescopic piston 5, and shown in both an extended position (FIG. 2A) and a compressed position (FIG. 2B). As the aircraft prepares for landing, the landing gear equipment including strut body 3 containing telescoping piston 5 are deployed from a stowed position within aircraft hull 1, to an extended position. While the aircraft is still in flight and with no weight currently being supported by the landing gear, the pre-charge pressure inside each respective landing gear will force the telescopic feature of piston 5 to maintain its full extension limits from within strut body 3; where the amount of exposed chrome finish 6 of telescopic piston 5 will be large. When the aircraft has landed and the full weight of the aircraft is resting on the respective landing gear, the gear will have compressed and the amount of exposed chrome finish 6 of telescopic piston 5 will be small. Camera 17 is located on the lower side of aircraft hull 1 and positioned so that the "field of view" 19 of camera 17 has an unobstructed view of the landing gear, which includes the full range of the movement of telescopic piston 5. The changing amount, or length, of visible chrome finish 6 of telescopic piston 5 is detected utilizing image recognition software (as described below with reference to FIGS. 8A, 8B and 8C) and the comparison of an initial photograph illustrating a first distance x, to later subsequent photograph or photographs illustrating a second distance y. As an alternate method of measuring the amount of landing gear strut compression, the landing gear components have various unique physical features on both the upper stationary portion of strut body 3 as well as the lower telescopic piston 5, that are easily identified in photographs and can be recognized for the individual strut mapping process. Examples of these features are the upper torque link rotation collar 9 of strut body 3 and lower torque link rotation collar 11 of telescopic piston 5, which are both features of the landing gear scissor link 7 assembly (FIG. 1.) Photographs taken with camera 17 identify and illustrate these unique physical features which allow these valid reference points which are identified and compared to the identical features in subsequent photographs, thus determining the distance relationship between the two distinct features, as mapped and measured, in relation to elapsed time.

Referring now to FIG. 3, there is again shown a close up view of strut body 3 containing telescopic piston 5, and shown in an extended position. As the aircraft prepares for landing, the landing gear equipment consisting of strut body 3 containing telescoping piston 5 are deployed from within aircraft hull 1. While the aircraft is still in flight, as well as through the entire landing event, the landing gear is fully illuminated by a light source 18. Light source 18 is located on the lower side of aircraft hull 1 and positioned that the "area of illumination" 20, of light source 18 has an un-obstructed view of the landing gear which includes the full range of the movement of telescopic piston 5, as viewed by camera 17. The area of illumination 20 corresponds to camera 17 field of view 19. Light source 18 receives power via wiring harness 23.

Figure 3:
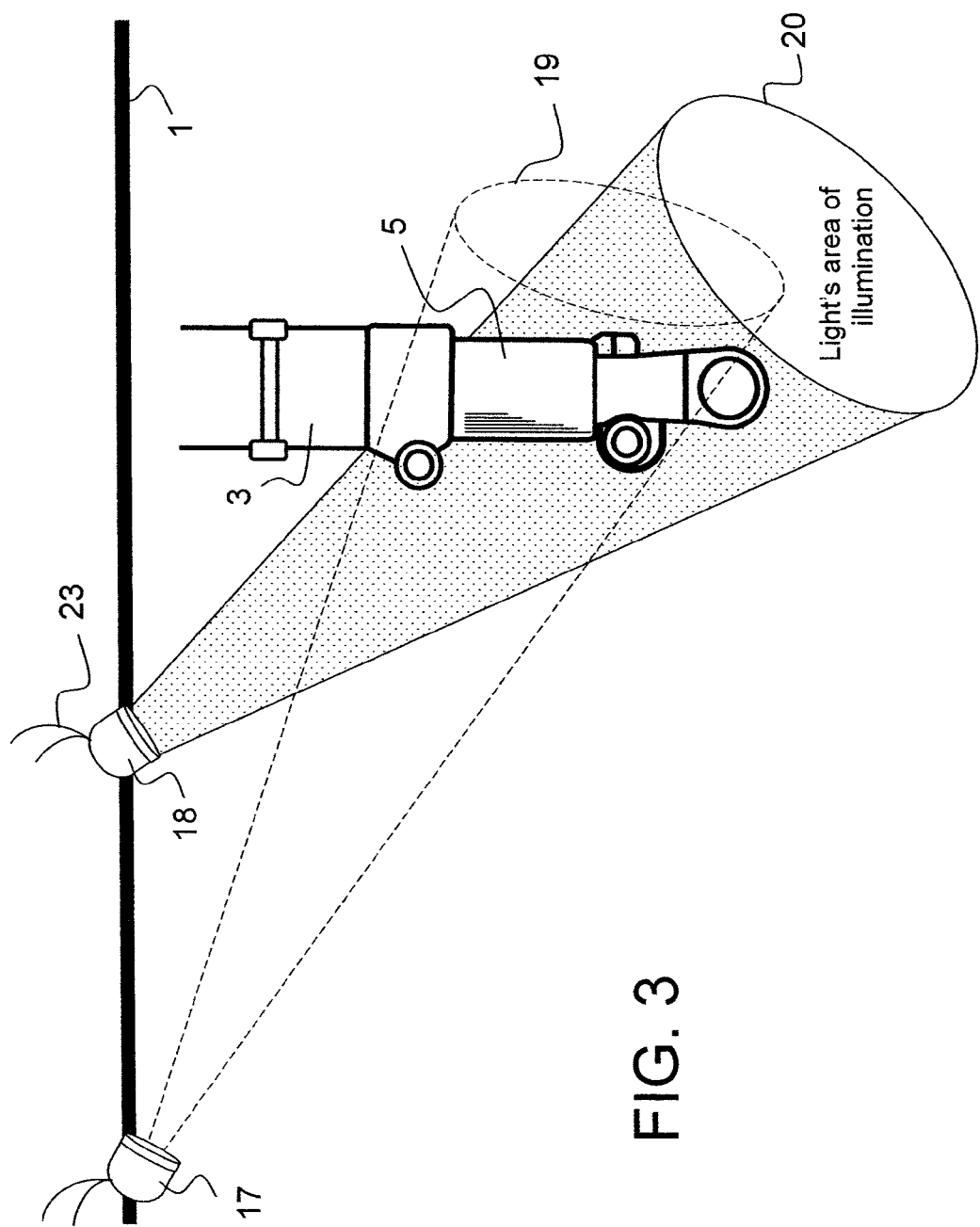
FIG. 3 is the side view of a typical telescopic design commercial airliner landing gear strut in an extended configuration, with attached light source, identifying the light's area of illumination.
Figure 4B:
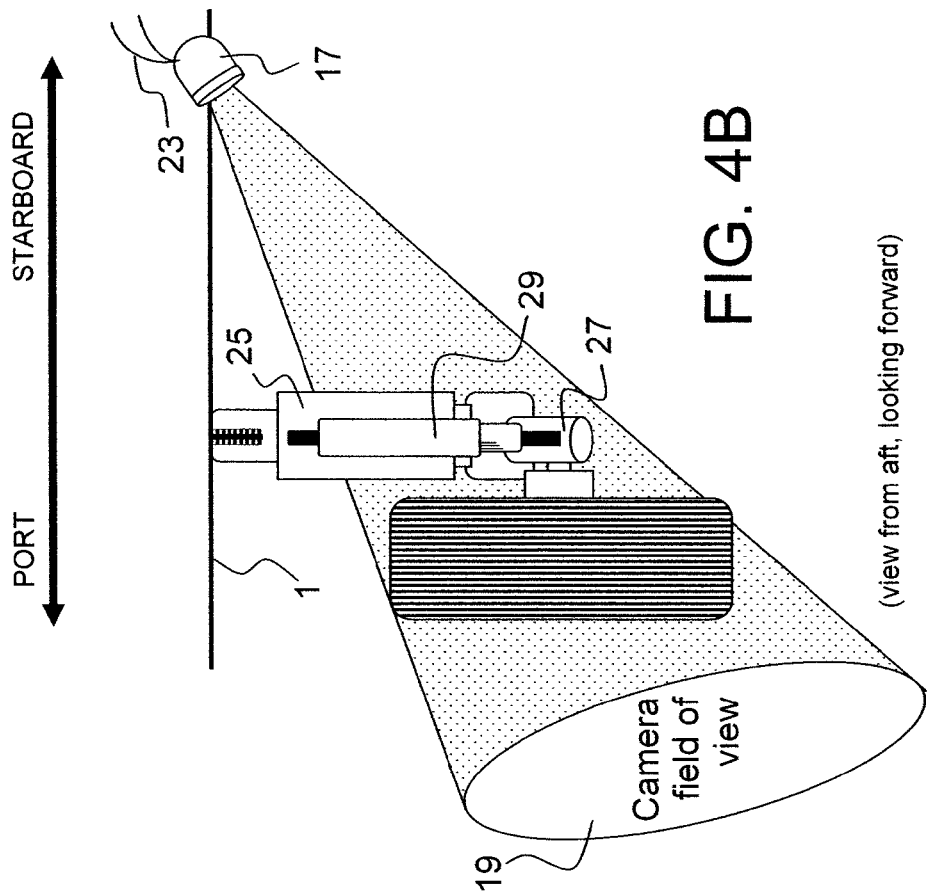
FIGS. 4A and 4B are a side and rear view of a typical trailing arm design landing gear strut relation to the lower portion of the aircraft hull, with attached high speed camera unit, identifying the camera's field of view.
Figure 4A:
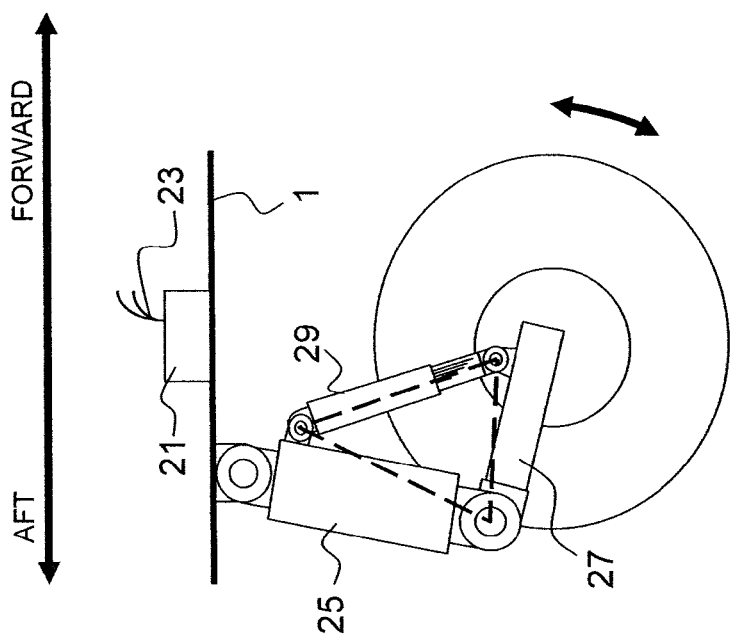

FIGS. 1-3 show a telescoping type of strut. Referring now to FIG. 4 there is shown a different configuration of a typical landing gear referred to here as alternate strut 25, which is commonly used on smaller "regional type" aircraft. For better illustration, alternate strut 25 is shown facing in two directions. A side view (FIG. 4A) of strut 25 is labeled to illustrate the AFT and FORWARD ends of the aircraft. A view from the rear (FIG. 4B) of strut 25 is labeled PORT and STARBOARD indicating the strut in relation to those sides of the aircraft. Alternate strut 25 is designed with a trailing arm 27. In this configuration the loads experienced at aircraft landing are transferred to the internal pressure within shock absorber 29. These three structural components of this landing gear design form a triangle (illustrated by a dashed-line). A high-speed digital camera 17 is positioned on the lower side of aircraft hull 1, laterally in relation to alternate strut 25, so that it may view alternate strut 25 from the side and monitor angle changes, when trailing arm 27, rotates in an upward motion, during the aircraft landing event. Camera 17 is attached to the under-side of aircraft hull 1 in a manner which allows an unobstructed "field of view" 19 of the entire range of movement of rotating trailing arm 27. Trailing arm 27 rotational movement is rapidly photographed multiple times during the landing event. Inclinometer 21 is attached to aircraft hull 1 to monitor and measure the changing aircraft hull angle during the landing event, as compared to that if the aircraft were level. Data relative to aircraft inclination and the multiple photographs illustrating the changing angle of landing gear trailing arm 27 are transmitted to the system computer 37 (FIG. 7) via wiring harness 23.

Figure 5:
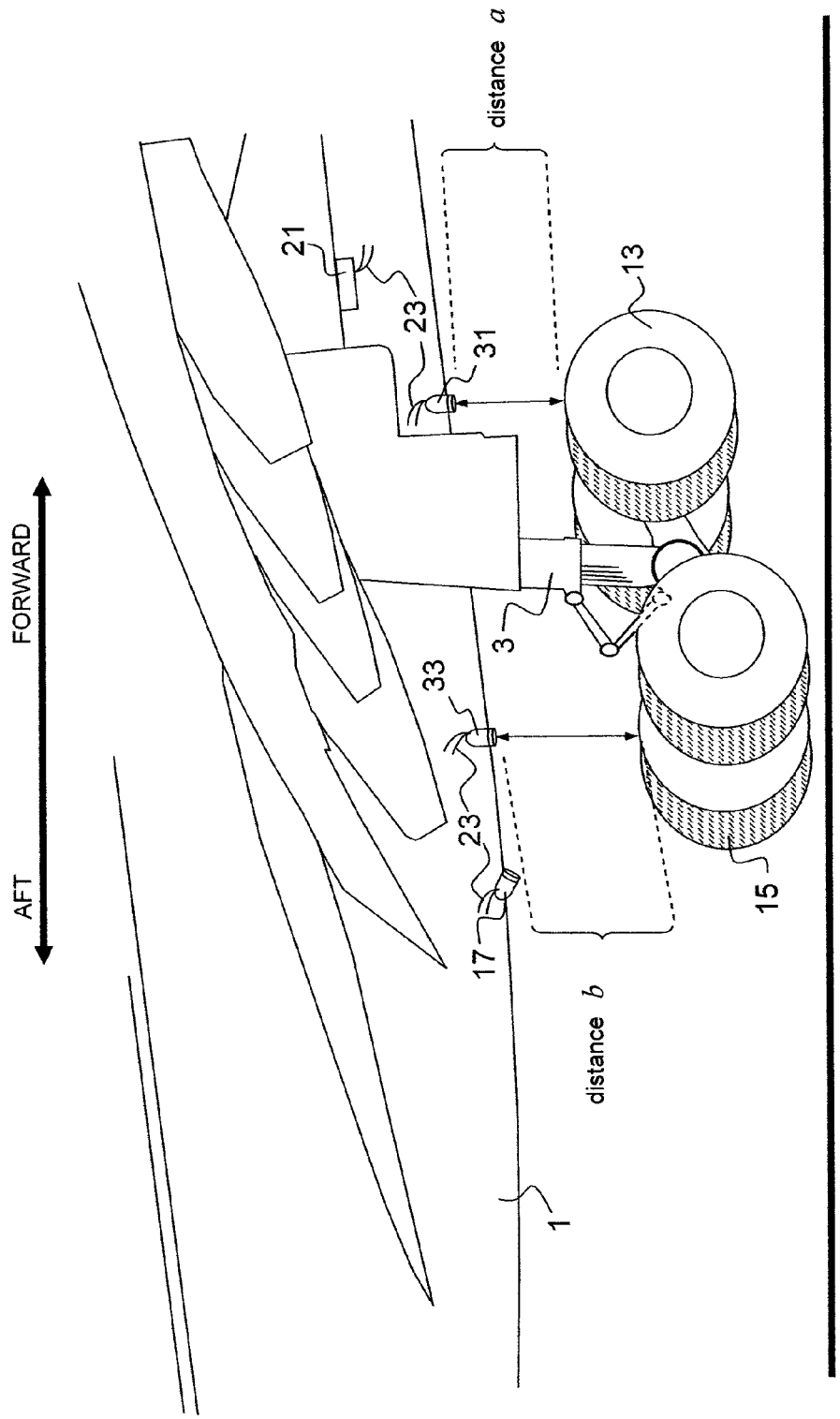
FIG. 5 is the side view of a typical telescopic design commercial airliner landing gear strut in relation to the lower portion of the aircraft hull, with attached targeted range-finders.

Referring now to FIG. 5, there is again shown typical aircraft hull 1 with extended landing gear strut 3. The embodiment shown in FIG. 5 utilizes distance measuring devices, which in the preferred embodiment are range-finders. Examples of range-finder devices can be of the sonic or laser type. A first range-finder 31 is located on the lower side of aircraft hull 1, forward of strut 3 with a second range-finder 33 located on the lower side of aircraft hull 1, aft of strut 3. These respective range-finders 31 and 33 are attached directly above forward landing gear tire 13 and aft landing gear tire 15. The respective range-finders 31 and 33 are attached in a manner so they may "without obstruction" monitor and measure the distance between the top of each respective landing gear tire 13 and 15, to that of each respective point of the fixed range-finders 31 and 33. The variable distance measured between forward tire 13 and respective forward range-finder 31 is illustrated by distance a. The variable distance measured between aft tire 15 and respective aft range-finder 33 is illustrated by distance b. Continual measurements are taken prior to and during the landing event, in relation to elapsed time, to determine when the aircraft has actually come into contact with the ground as well as calculate the closure rate of tire 15, to "aft" range-finder 33, as compared to that of the rate of an increasing distance of tire 13 from "forward" range-finder 31. As the aircraft landing gear comes into initial contact with the ground this landing gear "truck-beam design" allows the aft tire 15 to come into contact first, followed by the forward tire 13. This action will have the forward tire 13 initially traveling in a direction away from aircraft hull 1, then reversing direction as the forward landing gear tire 13 comes into contact with the ground, then having the forward tire 13 coming closer to aircraft hull 1. These opposing directions of movement of respective tires 13 and 15, and rate of movement, further refined with calculations made regarding the geometry of the rotating features the landing gear truck-beam, determine the vertical compression rate of landing gear 3 (described more fully in FIG. 10). Computer 37 (FIG. 7) compares the changing distance values, as related to elapsed time, to determine the compression rate of strut 3 and further determine the vertical velocity of the aircraft, during the landing event. Computer 37 (FIG. 7) receives rapid measurement data relative to the closure rate, via wiring harness 23. An inclinometer 21 is attached to the aircraft hull 1 which monitors and measures the changing aircraft hull angle during the landing event. The angle of aircraft hull 1 in relation to landing gear strut body 3 is fixed, and a known value that will not change. As the aircraft approaches the landing event and the pilot begins a flare procedure to bring the aircraft into initial contact with the ground, aircraft hull 1 may change in angle as compare to level. Inclinometer 21 determines the amount of angle difference of the aircraft from level so that the computer 37 can identify what adjustment "if any" must be made in correct landing gear compression rate values, to determine a true vertical rate of compression.

Figure 6:
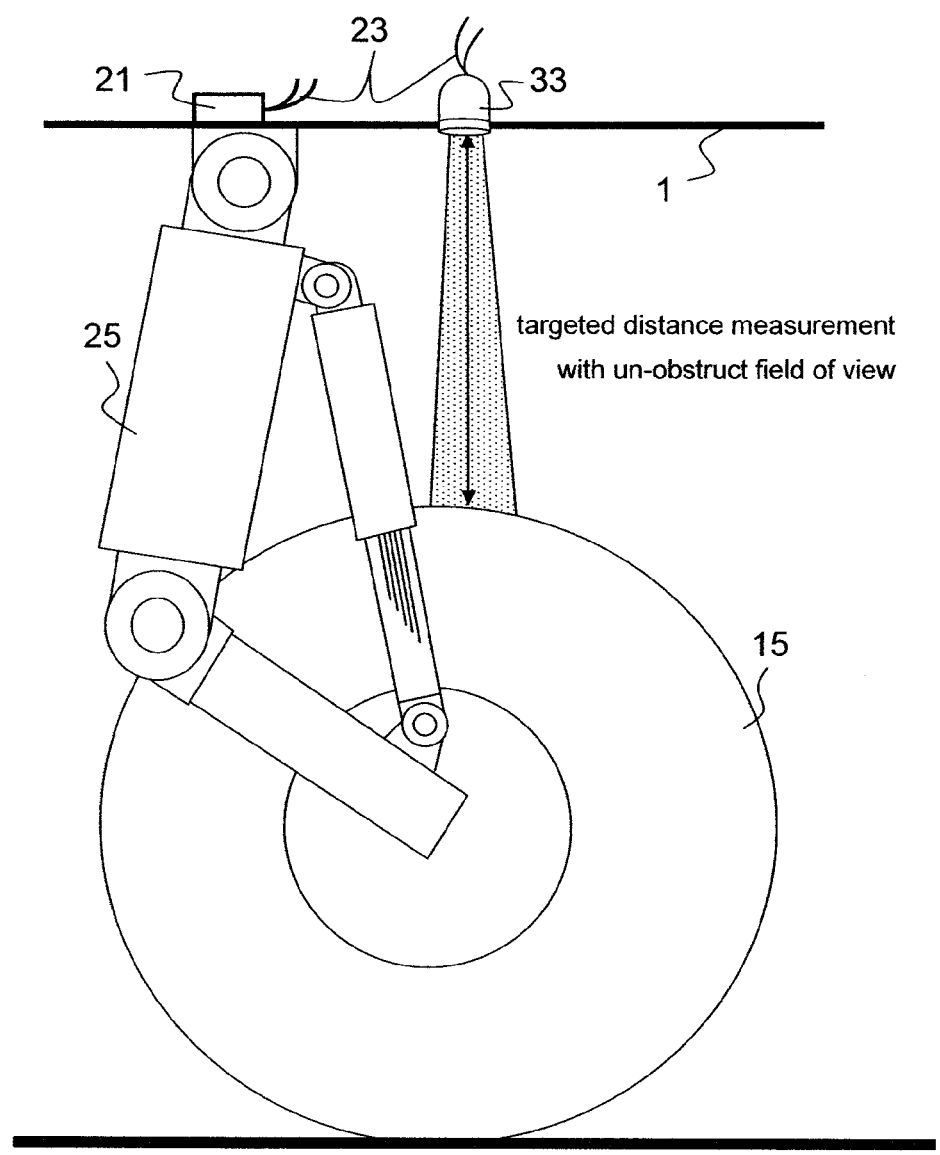
FIG. 6 is the side view of a typical trailing arm design landing gear strut, with attached targeted range-finder.

Referring now to FIG. 6, there is again shown alternate strut 25 where a range-finder 33 is positioned on the lower side of aircraft hull 1, directly above landing gear tire 15. The fixed point positioning of range-finder 33 is at a location where it may "without obstruction" measure the distance from the top of tire 15 to said fixed point on aircraft hull 1. Computer 37 (FIG. 7) compares the continuous stream of measurement data of the changing distance values, as related to elapsed time to determine the vertical velocity of the aircraft, during the landing event. Computer 37 (FIG. 7) receives this continuous stream of measurement data relative to the distance from the tire and the aircraft hull via wiring harness 23. Inclinometer 21 is attached to the aircraft hull 1 to monitor and measure the changing aircraft hull angle, during the landing event. As the aircraft starts the landing event, the hull of the aircraft changes angle and the comparison of that changing aircraft hull angle, to landing gear trailing arm angle, is made to correct errors in trailing arm angle determinations to determine a true vertical rate of compression.

Figure 7:
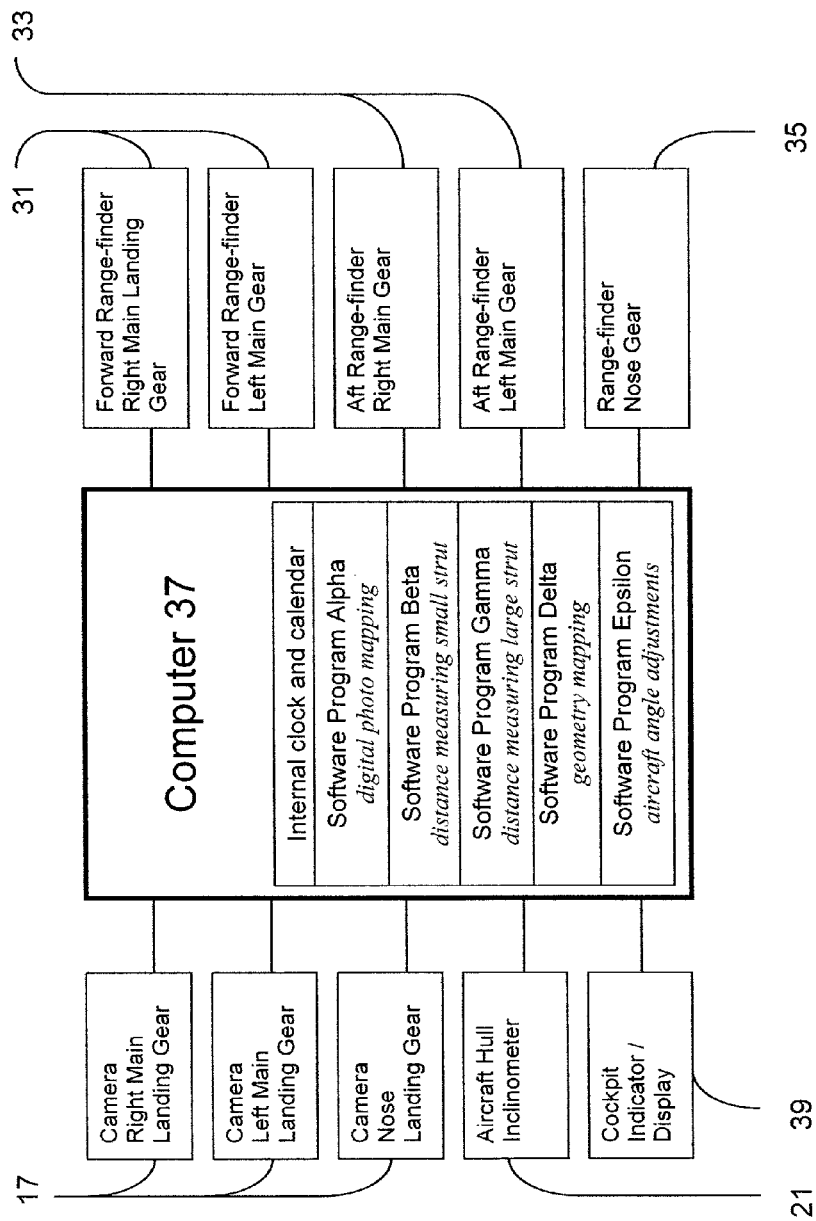
FIG. 7 is an apparatus block diagram illustrating the computer and attached cameras and sensors of the present invention, in accordance with a preferred embodiment.
Figure 9A:
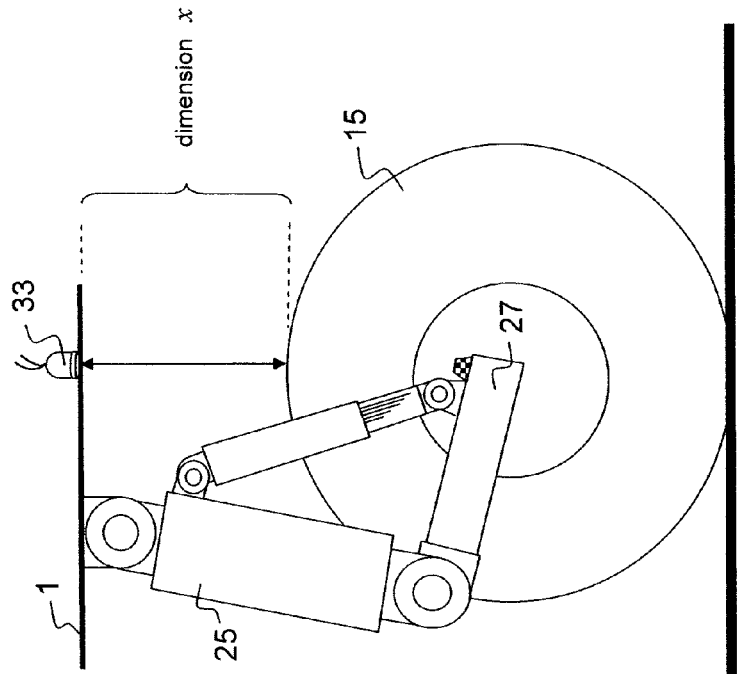
FIGS. 9A, 9B, 9C and 9D are an illustration of software program Beta—Distance Measuring and Comparison of Small Landing Gear Strut Compression, which determines a measured amount of the aircraft landing gear compression, as related to elapsed time by measuring landing gear strut compression through data evaluation of attached range-finder devices.
Figure 9B:
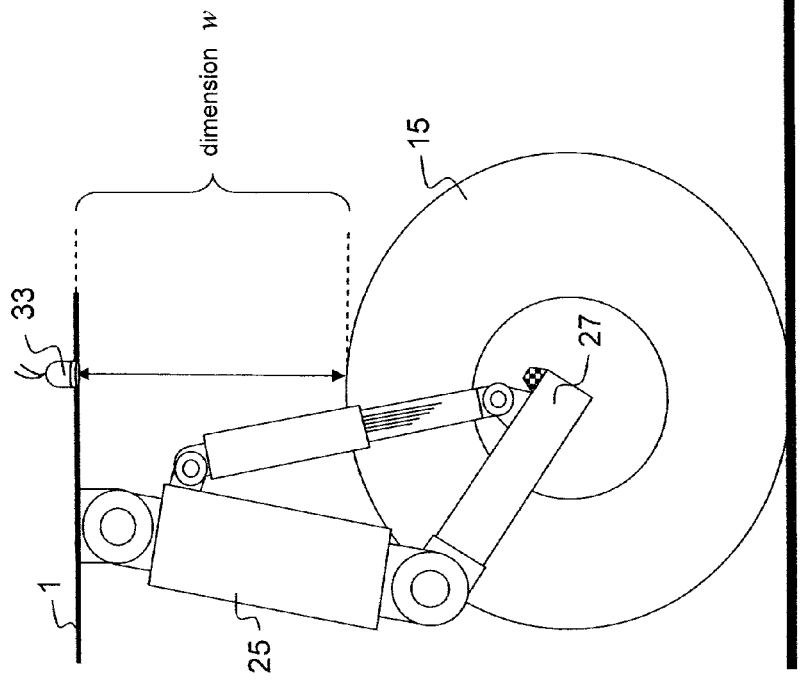
Figure 9C:
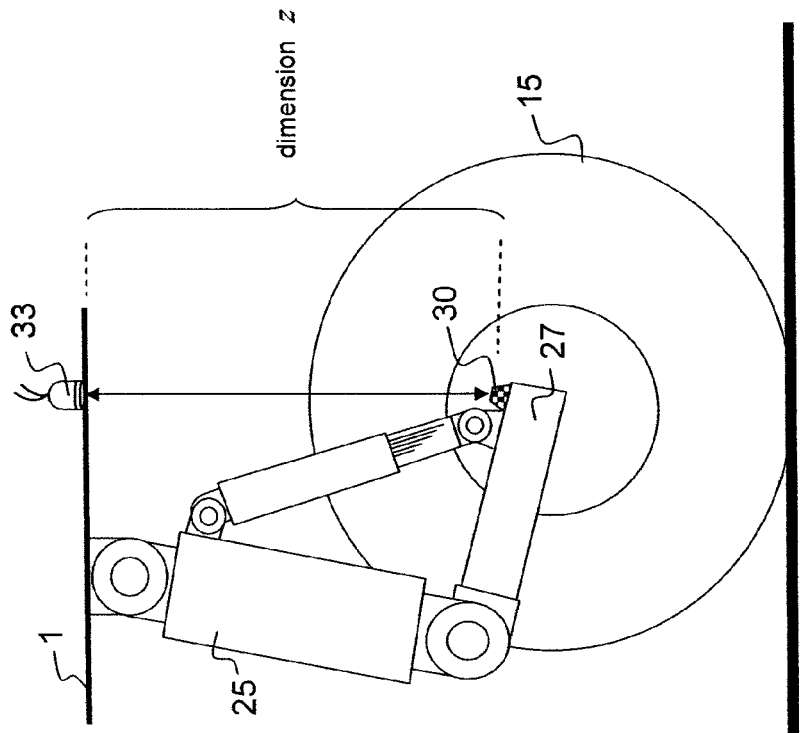
Figure 9D:
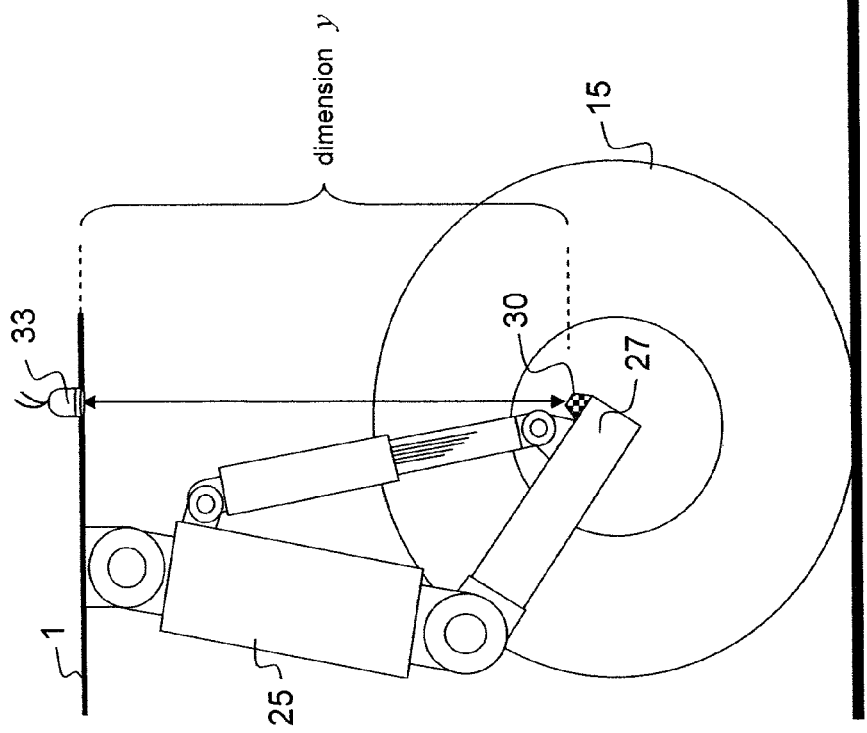

Referring now to FIG. 7, there is shown a block diagram illustrating the apparatus of the invention, where multiple (nose, left-main and right-main landing gear) high speed digital cameras 17 and range-finders 31, 33 and 35 (35 being nose landing gear range-finder, not shown in previous FIGS.); are sources of data input into computer 37. Aircraft hull inclinometer 21 also inputs into computer 37. The computer 37 output determinations and information are transmitted to an indicator 39 (FIG. 1), such as a display. Multiple photographs of changing amounts of strut compression are taken by each respective camera 17 (FIGS. 1 and 4) and transmitted via wiring harness 23 to onboard computer 37. Various changes of aircraft hull angle, measured by inclinometer 21 (FIGS. 1 and 4) are transmitted via wiring harness 23 to onboard computer 37. Computer 37 receives power from the aircraft power sources. Computer 37 is equipped with an internal clock and calendar to document the time and date of stored data. Computer 37 has multiple software packages which include: Software Program Alpha—Digital Photograph Mapping and Comparison of Landing Gear Strut Compression, which maps visual images and uses image recognition of various levels of landing gear strut compression and relates that rate of compression to the vertical descent velocity of the aircraft; Software Program Beta—Distance Measuring and Comparison of Small Landing Gear Strut Compression, which measures the distance between the landing gear tire or reflector and the aircraft hull, as well as the rate of that change in distance; Software Program Gamma—Distance Measuring and Comparison of Large Landing Gear Strut Compression, being a more complex sequence of events which measure the increasing and decreasing distances between multiple landing gear tires and the aircraft hull, as well as the rate of that change in those distances; Software Program Delta—Measuring and Comparison of Strut Geometry, which maps visual images of the changing triangular shapes of various levels of landing gear strut compression and relates that rate of compression to the vertical descent velocity of the aircraft; Software Program Epsilon—Aircraft Approach Angle Compensation, which uses inclinometer data to correct the rate of strut compression calculating for non-level aircraft postures.

Referring now to FIGS. 8A, 8B, and 8C, there are shown illustrations of software program Alpha—Digital Photograph Mapping and Comparison of Landing Gear Strut Compression, which determines a measured amount of the landing gear telescopic compression, as related to elapsed time. Camera 17 (FIG. 1) takes photographs at a high sample rate. In the description below, an example is given. The camera 17 takes photographs at a rate of 1,200 photographs per second. Photographs are continuously taken and stored within a memory-loop of the computer. A slower rate of photography, with a lesser number of photographs per second may be utilized to reduce computer memory capacity requirements. Software Program Alpha reviews all photographs to determine if the amount of strut compression has changed from previous sequential photographs. When a change in the amount of strut compression is identified, indicating the commencement of the touch-down event, Software Program Alpha discontinues the memory-loop program and stores the previously mapped 100 photographs which confirm no strut movement prior to the commencement of the touch-down event.

Subsequent photographs are then mapped and determinations are made as to the amount of strut compression that has occurred, over each 1/10th of a second. A total of 1,200 sequential photographs will be mapped to complete a 1 full second of elapsed time. The comparison of various mapped amounts of strut compression will allow for the determination of the strut compression rate, as compared to elapsed time. Comparison of strut compression values is mapped by recognition of various distinct features of the landing gear strut. The strut piston 5 is a telescopic component with a high gloss chrome finish 6 (illustrated here by tightly grouped vertical lines), which is easily identifiable in the photographs. An alternate means of feature recognition is the comparison of the distance between the upper torque-link rotation collar 9 and lower torque-link rotation collar 11. The measurements of strut compression are made by a comparison of rapid sequential photographs of the various amounts of strut compression (or trailing arm rotation as shown in FIG. 4A), in relation to other non-moving portions of the landing gear. The amount of landing gear strut extension or compression can be determined by mapping and measuring the amount of exposed chrome 6 of piston or angle changes of trailing arm. The actual computations illustrated in this description can be in the form of a mapping look-up table, stored within the memory of the computer. The computer records the digital photographs received from respective cameras and recorded in relation to elapsed time. Stored within the memory of computer is the image of a fully extended landing gear strut (FIG. 8A), as well as the image of that same strut, compressed by an amount of one inch. FIGS. 8B and 8C show the compressed strut later in time after initial contact with the ground. The software will review the numerous photographs taken during the landing event and measure the elapsed time between the final photograph taken of the fully extended strut, just prior to initial contact with the ground; until the recognition of later sequential photograph that matches the 1 inch compressed strut. The determination of elapsed time that has passed to achieve that defined amount of strut compression is used in the determination of the landing gear compression rate. The comparison of strut compression in relation to elapsed time determines the aircraft touch-down velocity experienced during a landing event. Compression rate of the landing gear at initial contact of the landing gear with the ground is determined, as well as the descent velocity of the aircraft experienced by each landing gear strut is determined. The descent velocity is the compression distance of the strut over the brief period, as the landing gear come into initial contact with the ground. Thus, the compression rate of the aircraft landing gear at initial contact with the ground is determined as follows. First, the extension of each strut is photographed, mapped and measured before the strut comes into contact with the ground. Then, during initial contact of the strut with the ground, the strut compression is again photographed, mapped and measured in relation to elapsed time. The period of initial contact is brief, lasting only a fraction of a second. The software calculates the strut compression rate upon initial contact with the ground. The compression rate is zero before initial contact. At initial contact, the compression rate is high. The compression rate then decreases throughout the remainder of the landing event, as the aircraft settles on its landing gear. In addition, the software determines if the compression rate for each strut exceeds a predetermined threshold (for example, equivalent to the aircraft vertical velocity of 10 feet per second). The threshold for the nose strut may be smaller than the threshold for the main struts. If the threshold is not exceeded, then no further indication is provided. If the threshold is exceeded by one or more struts, then an indication is provided that identifies the strut or struts and the amount the compression rate exceeds the threshold. This indication is used for inspection purposes. Mechanics can access the information, see which if any, strut needs inspection, and then carry out the inspection of the strut and airframe.

In FIGS. 8A, 8B and 8C, horizontal lines are shown and used as an "overlay to the background" of all photographs, and used as a dimensional reference scale or measurement tool; that determination of minor changes in strut compression, are better identified. In actual practice, the background behind the strut will also show the variations from the moving tarmac and landscaped horizon, which provides a good contrast for the strut, which is relatively stationary in relation to the camera, for each photograph. In order to save on processing power, every photograph need not be analyzed. Instead, a number of photos can be skipped and then used if needed. For example, every tenth photo can be analyzed initially for strut compression. If additional data is needed, such that the strut rate of compression slowed down, then the photos that were initially unused can be analyzed.

Referring now to FIGS. 9A, 9B, 9C and 9D there are shown illustrations of software program Beta—Distance Measuring and Comparison of Small Landing Gear Strut Compression, which determines a measured amount of the aircraft landing gear compression, as related to elapsed time. A distance measuring device 33 measures the distance between its fixed location on the lower portion of the aircraft hull 1 and a targeted component attached to the movable portion of the landing gear trailing arm 27. The changing amount of distance between the target and distance measuring device 33 are recorded at a high sampling rate, which in the preferred embodiment are range-finders 33. Examples of range-finder devices are of the sonic or laser type. Various components on the movable lower portion of the landing gear strut are available to be used as targets for range-finder 33. As an example, the embodiment shown in FIGS. 9A and 9B utilizes a sonic range-finder which measures the changing amount of distance between the top of movable tire 15 and sonic range-finder 33. Sonic range-finder 33 measures distance at a rate of 50,000 samples per second. Measurement can be recorded in inches or centimeters. As a second example, the embodiment shown in FIGS. 9C and 9D utilizes a laser range-finder which measures the changing amount of distance between the top of a multi-faceted, highly reflective, signal reflector 30 in relation to distance of the fixed position range-finder 33 located on aircraft hull 1. Tire 15 and signal reflector 30 are two of the many available points that can be utilized as focus targets for the range-finder 33. As an alternative embodiment (not shown) range-finder 33 may be attached to trailing arm 27 with its targeted focus on aircraft hull 1 or on some other non-moving part of the aircraft such as a fixed portion of the strut. In this configuration signal reflector 30 may be attached to aircraft hull 1 to improve the effectiveness of range-finder 33. Tire 15 (FIGS. 9A and 9B), in relation to distance from the fixed position range-finder 33 located on aircraft hull 1 is detected by the comparison of an initial measurement illustrated by a first distance w, to later measurement, taken after the aircraft landing gear has initially come into contact with the ground, and illustrated by a second distance x. Signal reflector 30 (FIGS. 9C and 9D), in relation to distance from the fixed position range-finder 33 located on aircraft hull 1 is detected by the comparison of an initial measurement illustrated by a first distance y, to later measurement, taken after the aircraft landing gear has initially come into contact with the ground, and illustrated by a second distance z. The measurements, related to elapsed time, will determine the compression rate of the landing gear. In addition, FIGS. 9A, 9B, 9C and 9D illustrate the rotation of the trailing arm 27 during a landing event; this is described in more detail below with respect to FIGS. 11A, 11B.

Figure 10A:
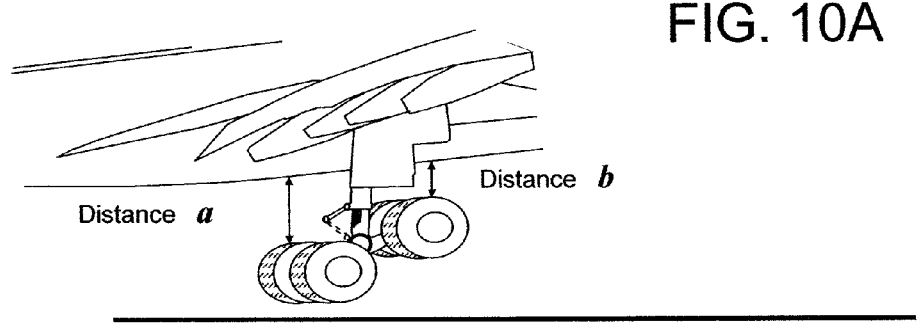
FIGS. 10A, 10B, and 10C are an illustration of software program Gamma—Distance Measuring and Comparison of Large Landing Gear Strut Compression, which determines aircraft vertical velocity at initial contact with the ground, for large aircraft which have landing gear designs utilizing rotating truck beams, through data evaluation of attached range-finder devices.
Figure 10B:
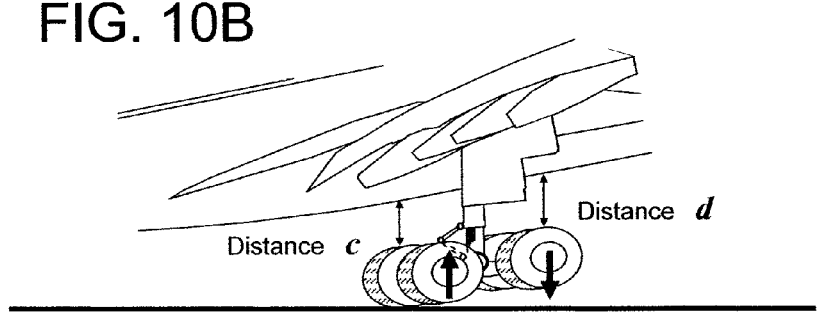
Figure 10C:
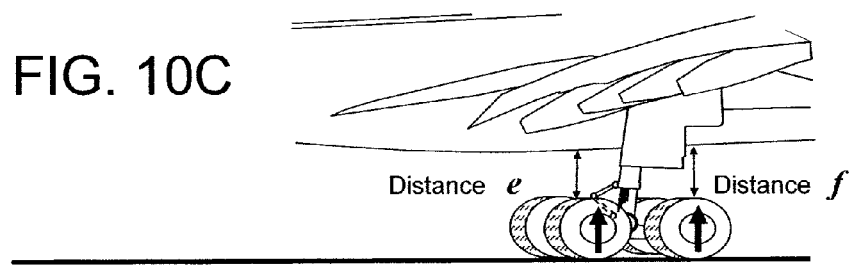

Referring now to FIGS. 10A, 10B and 10C, there are shown illustrations of software program Gamma—Distance Measuring and Comparison of Large Landing Gear Strut Compression, which expands the capabilities of Software Program Beta (described earlier) to the more complex geometry of large wide-body aircraft with truck-beam design landing gear. Larger wide-body aircraft utilize multiple tires on each landing gear located at opposite ends of a rotating truck-beam. This becomes a more challenging task in determining true vertical strut compression rate. As an alternate means of distance measurement, the distance measuring program monitors both the forward and aft tires of the landing gear. Prior to initial contact with the ground (see FIG. 10A), the landing gear truck-beam positions the rear, or aft, tire in a lower position, to come into contact with the ground first (distance a). The forward tire is positioned higher (distance b). These values remain constant until the aft tire initially comes into contact with the ground. At the moment of contact with the ground (see FIG. 10B), the distance of the aft tire from the aircraft hull decreases (distance c); while the distance of the forward tire from the aircraft hull will increase (distance d). The forward tire will increase in distance from the aircraft hull for a very short period of time. As aircraft continues the vertical descent to the ground, the landing gear truck-beam becomes level with the ground, and the front tire will come into contact with the ground and reverse direction (see FIG. 10C), to begin to reduce in distance (distance f) to the aircraft hull. Forward tire (distance f) will now move at the same rate as the aft tire (distance e). Analysis of the geometry of the particular landing gear truck-beam design allows calculations to determine a true vertical rate of compression of the strut, as well as the vertical descent velocity of the aircraft. The changing measurement of (distance a) alone can (same as described in Software Program Beta) be used, as the true closure rate of the aircraft, to the ground. Software Program Gamma is used as a means of confidence verification of Software Program Beta, that the strut compression rate calculations have a secondary means of cross-check and are correct.

Figure 11A:
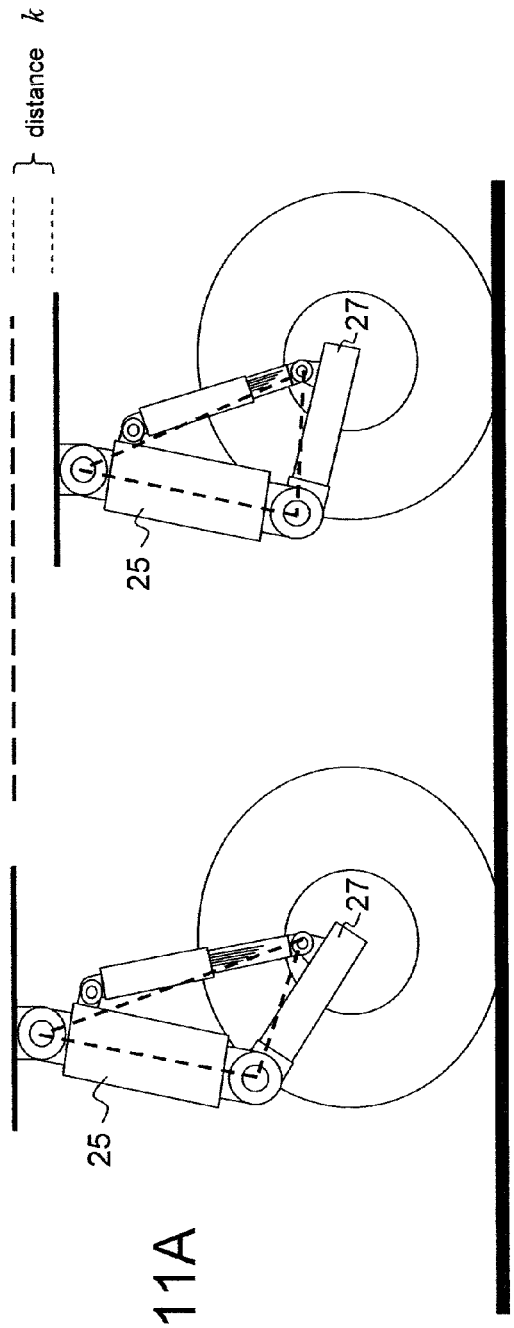
FIGS. 11A and 11B are an illustration of software program Delta—Measuring and Comparison of Strut Geometry, which maps and compares extension amounts of landing gear telescopic and trailing arm components, using triangle geometry shape recognition.
Figure 11B:
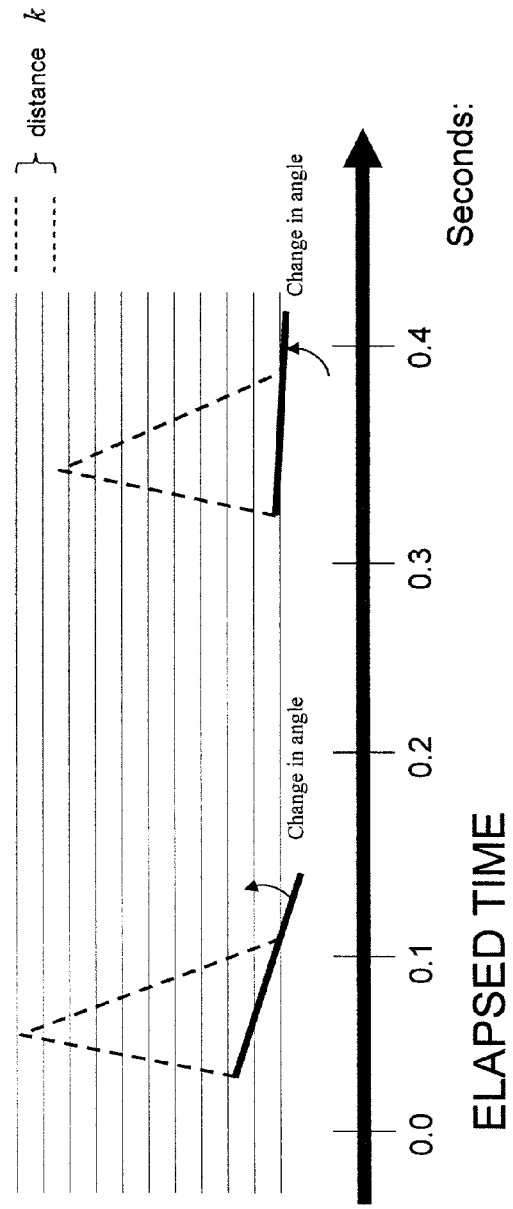

Referring now to FIGS. 11A, 11B, there is shown an illustration of software program Delta—Measuring and Comparison of Strut Geometry, which uses simple geometry to determine angle changes of trailing arm 27 in relation to alternate landing gear strut 25. The three structural components of this landing gear design form a triangle (illustrated by a dashed line). Digital photographs are mapped (as described in FIGS. 8A-8C) by comparison of sequential photographs, determining and mapping the changing triangle shapes made by the three structural components, in each photograph, then determining the changes in the angle between the strut 25 and trailing arm 27. Trigonometry and algorithms are used to determine the amount of strut compression, in relation to a true vertical change in distance as illustrated by (distance k). The changes in vertical strut compression is compared against elapsed time and descent velocity, as well as compression rate, is determined.

Figure 12A:
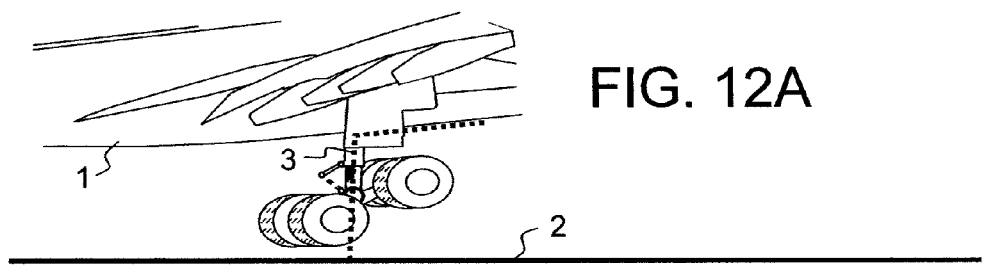
FIGS. 12A, 12B and 12C are an illustration of software program Epsilon—Aircraft Approach Angle Compensation, which uses inclinometer data to correct rate of strut compression calculations for non-level aircraft posture.
Figure 12B:
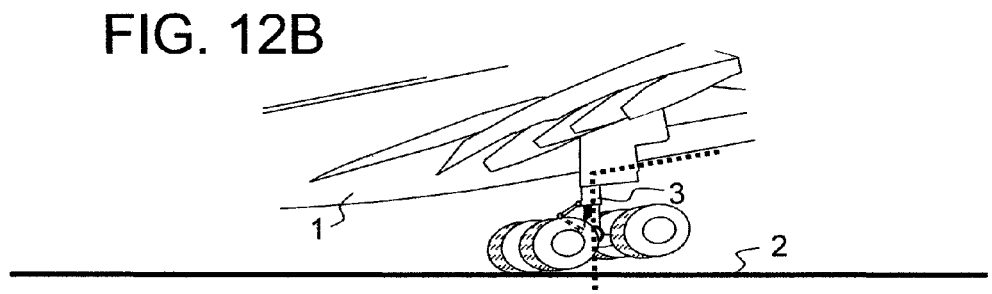
Figure 12C:
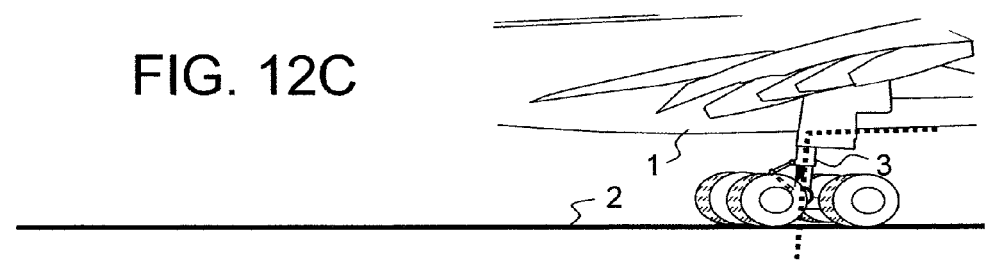

Referring now to FIGS. 12A, 12B and 12C there is shown an illustration of software program Epsilon—Aircraft Approach Angle Compensation, which compensates for the aircraft hull 1 not being level as the aircraft starts and continues through the landing event. The angle of the landing gear strut body 3 in relation to the aircraft hull 1 is fixed and does not change. The angle of landing gear strut body 3 may not be perpendicular to the aircraft hull 1. Furthermore, while the aircraft is in flight and commences the landing event, aircraft hull 1 will change angle prior to and during the landing event. Adjustments for the changing aircraft hull 1 angle, to that of what the aircraft hull 1 would be when level to ground 2 (see FIG. 1) are made to correct for differences in strut body 3 angle determinations, as compared to strut body 3 when vertical to the ground 2. The corrections adjust the landing gear rate of compression to that equivalent of aircraft hull 1 being in a level position to ground 2, so as to determine the "true" vertical value of descent velocity. After being corrected for hull inclination to horizontal and strut inclination relative to the hull, the vertical component is determined, which is used to determine the vertical descent velocity. Alternatively, the inclinometer can be located on the landing gear strut body 3 to measure directly the inclination of the strut body to body to allow for correction and obtain vertical descent velocity. This corrective program may be applied to the processes of all compressible landing gear designs.

The acquisition of data, such as capturing photograph images of strut compression, distance measurements from aircraft hull to landing gear tires, and aircraft hull inclinometer data, starts while the aircraft is still in flight, immediately after the landing gear are extended from within the aircraft. Computer 37 determines the aircraft is still in flight, having yet to come into initial contact with the ground, by the analysis of incoming data that recognizes the landing gear struts are all maintaining full extension. Strut data is recorded and stored within the computer in a memory-loop that stores the data, acquired over a defined period of time. In this case, the memory-loop is a ten second period of time (the duration of the memory-loop period can be changed). As the strut data is stored and subsequent ten second periods are completed; if there is no change in the recorded data, the previous data is discarded and replaced with the new data, and again stored within the ten-second memory-loop. This process will repeat until such time as the computer detects changes in data stream received from sensor and camera inputs. Once changes in the data stream are determined, the computer then recognizes the commencement of a landing event. The ten second memory-loop routine is then concluded and the new changing data is permanently stored within the computer for further comparisons and analysis; until such time as the stream of data into the computer again remains constant, which identifies when the aircraft has completed the landing event, is parked and stands at rest.

However the strut extension is measured, such as by a camera or a range-finder, the strut extension is measured through the landing event. The landing event is from just before the strut has made contact with the ground, when the wings generate lift to support the aircraft off of the ground, to the strut in contact with the ground and the wings no longer generate lift, so that the full load of the aircraft is borne by the struts. Typically, the highest descent velocity will occur upon initial contact of the strut with the ground. However, due to landing vagaries, the highest descent velocity may occur sometime after initial contact of the strut with the ground. Therefore, preferably, strut compression measurements are taken through the landing event so that the highest descent velocity can be found if not at the beginning of the event. As used herein, "initial contact" means the contact of interest in determining descent velocity, whether that contact is truly the first contact or a subsequent contact, such as from a bounce of the aircraft.

Although an exemplary embodiment of the invention has been disclosed and discussed, it will be understood that other applications of the invention are possible and that the embodiment disclosed may be subject to various changes, modifications, and substitutions without necessarily departing from the spirit and scope of the invention.

What is claimed is:

1. A method of monitoring landing gear on an aircraft at initial contact of the landing gear with the ground, each landing gear comprising a strut, which is capable of extension, comprising the steps of:
   a) measuring the extension of one of the struts before contact of the respective landing gear with the ground;
   b) measuring the extension of the one strut during initial contact of the respective landing gear with the ground;
   c) measuring the amount of changed extension of the one strut in relation to elapsed time;
   d) the steps of measuring the extension of one of the struts before contact of the respective landing gear with the ground and measuring the extension of the one strut during initial contact of the respective landing gear with the ground and measuring the amount of changed extension of the one strut in relation to elapsed time comprises measuring the strut extension from a location that is off of the one landing gear;
   e) determining the rate of compression of the one strut from the measured amount of changed extension of the one strut in relation to elapsed time;
   f) providing an indication of the rate of compression of the one strut.

2. The method of claim 1, further comprising the steps of:
   a) measuring an inclination, angle and pitch of the aircraft hull in relation to an aircraft landing gear strut, and
   b) correcting such landing gear strut angle to that of a vertical position so as to determine the rate of compression as to vertical.

3. The method of claim 1 wherein the step of measuring the strut extension from a location that is off of the one landing gear further comprises the step of photographing moving and non-moving parts of the landing gear strut.

4. The method of claim 3 wherein the step of photographing moving and non-moving parts of the landing gear strut further comprises the step of comparing changes in strut extension relative to earlier recorded strut extension of the same landing gear.

5. The method of claim 3 wherein the step of photographing moving and non-moving parts of the landing gear strut further comprises the step of photographing the landing gear with a high speed camera.

6. The method of claim 1 wherein the step of measuring the strut extension from a location that is off of the one landing gear further comprises the step of photographing an exposed portion of a telescoping element of a telescoping landing gear strut.

7. The method of claim 1 wherein the step of measuring the strut extension from a location that is off of the one landing gear further comprises the step of photographing a rotating element of a trailing arm landing gear strut.

8. The method of claim 1 wherein the step of measuring the strut extension from a location that is off of the one landing gear further comprises the step of determining the distance of a selected portion on the landing gear from the aircraft hull.

9. The method of claim 8, wherein the step of determining the distance of a selected portion on the landing gear from the aircraft hull further comprising the step of using a range-finder.

10. The method of claim 1, further comprising the steps of
    a) determining if the rate of compression exceeds a predetermined threshold;
    b) providing an indication if the rate of compression exceeds the predetermined threshold.

11. The method of claim 10 wherein:
    a) the steps of measuring the extension of one of the struts further comprises the steps of measuring the extension of all of the struts;
    b) the step of determining the rate of compression of the one strut further comprises the step of determining the rate of compression of all of the struts;
    c) the step of determining if the rate of compression exceeds a predetermined threshold further comprises the step of determining if each rate of compression exceeds the respective predetermined threshold;
    d) identifying which, if any, strut experienced a rate of compression that exceeds the respective threshold;
    e) providing an indication of the identified strut for inspection purposes.

12. A method of monitoring landing gear on an aircraft hull at initial contact of the landing gear with the ground, each landing gear comprising a strut, which is capable of extension, comprising the steps of
    a) measuring the extension of one of the struts before contact of the respective landing gear with the ground;
    b) measuring the extension of the one strut during initial contact of the respective landing gear with the ground;
    c) measuring the amount of changed extension of the one strut in relation to elapsed time by measuring the distance of a selected portion of the one strut from the hull;
    d) determining the rate of compression of the one strut from the measured amount of changed extension of the one strut in relation to elapsed time;
    e) providing an indication of the rate of compression of the one strut.

13. The method of claim 12 wherein the step of measuring the distance of a selected portion of the one strut from the hull further comprises the step of determining the distance of a tire on the one strut to the hull.

14. The method of claim 13 wherein the step of measuring the distance of a selected portion of the one strut from the hull further comprises the step of determining the distance of a reflector on the one strut to the hull.

15. The method of claim 12 wherein the step of measuring the distance of a selected portion of the one strut from the hull further comprises the step of using a range-finder.

16. A method of confirming that the aircraft has actually come into contact with the ground, the aircraft comprising landing gear struts, which struts are capable of compression and extension, comprising the steps of:
    a) determining when the landing gear struts are deployed to an extended position, the deployed struts having an extended configuration;
    b) from a location that is off of the landing gear, determining when the landing gear is compressed.

17. The method of claim 16 wherein the step of determining when the landing gear is compressed comprises the step of photographing moving and non-moving parts of the landing gear strut.

18. The method of claim 16 wherein the step of determining when the landing gear is compressed comprises the step of determining the distance of a selected portion on the landing gear from the aircraft hull.

19. An apparatus for monitoring landing gear of an aircraft during initial landing gear contact with the ground, each landing gear comprising a strut, comprising:
    a) a camera coupled to the aircraft and having a field of view that encompasses one of the struts so as to monitor the extension of the one strut;
    b) a computer having an input that is connected to said camera, said computer records the extension of the one landing gear strut in relation to elapsed time, said computer determines the rate of compression of the one landing gear strut and determines the descent velocity of the aircraft and provides a descent velocity output;

c) an indicator connected to the computer descent velocity output.

20. The apparatus of claim 19 further comprising a light source located on the aircraft so as to illuminate the one strut.

21. The apparatus of claim 19 further comprising:
a) a hull inclinometer coupled to the aircraft;
b) the computer has an input that is connected to the hull inclinometer, the computer compensating the measurements of landing gear rate of compression with the measurements from the hull inclinometer to determine a true vertical descent velocity.

22. The apparatus of claim 19 wherein the computer determines if the rate of compression exceeds a predetermined threshold and if so provides an output to the indicator.

23. An apparatus for monitoring landing gear of an aircraft during initial landing gear contact with the ground, each landing gear comprising a strut, comprising:
a) a range-finder coupled to the aircraft and located so as to monitor the extension of one of the struts;
b) a computer having an input that is connected to said range-finder, said computer records the extension of the one landing gear strut in relation to elapsed time, said computer determines the rate of compression of the one landing gear strut and determines the decent velocity of the aircraft and provides a decent velocity output;
c) an indicator connected to the computer descent velocity output.

24. The apparatus of claim 23 wherein the range-finder is directed so as to monitor a tire of the one strut.

25. The apparatus of claim 23 wherein the range-finder is directed so as to monitor a reflector.

26. The apparatus of claim 23 further comprising:
a) a hull inclinometer coupled to the aircraft;
b) the computer has an input that is connected to the hull inclinometer, the computer compensating the measurements of landing gear rate of compression with the measurements from the hull inclinometer to determine a true vertical descent velocity.

27. The apparatus of claim 23 wherein the computer determines if the rate of compression exceeds a predetermined threshold and if so provides an output to the indicator.

* * * * *